United States Patent
Dietrich

(10) Patent No.: US 6,886,629 B2
(45) Date of Patent: May 3, 2005

(54) PLATE HEAT EXCHANGER

(75) Inventor: Jörg Dietrich, Munich (DE)

(73) Assignee: Linde Akiengesellschaft, Weisbaden (DE)

( * ) Notice: Subject to any disclaimer, the term of this patent is extended or adjusted under 35 U.S.C. 154(b) by 84 days.

(21) Appl. No.: 09/851,432

(22) Filed: May 9, 2001

(65) Prior Publication Data
US 2002/0007938 A1 Jan. 24, 2002

(30) Foreign Application Priority Data
May 9, 2000 (DE) .......................... 100 22 595

(51) Int. Cl.⁷ .............................. F28F 3/00; B23K 20/08
(52) U.S. Cl. ........................ 165/166; 165/905; 165/76; 228/107; 219/118
(58) Field of Search ................................ 165/166, 905, 165/153, 173, 175, 76; 228/107, 109; 219/118; 29/890.052

(56) References Cited

U.S. PATENT DOCUMENTS

| | | | |
|---|---|---|---|
| 3,664,816 A | | 5/1972 | Finnegan .................... 29/196.2 |
| 3,855,682 A | * | 12/1974 | Chartet ........................ 228/223 |
| 3,992,168 A | * | 11/1976 | Toyama et al. .............. 165/166 |
| 4,010,965 A | * | 3/1977 | Izuma et al. ................. 428/651 |
| 4,756,464 A | * | 7/1988 | Hardwick .................... 228/107 |
| 5,213,904 A | * | 5/1993 | Banker ......................... 428/651 |
| 5,501,271 A | * | 3/1996 | Wijkstrom ................... 165/173 |
| 5,655,792 A | * | 8/1997 | Booher ................... 228/262.44 |
| 6,173,493 B1 | * | 1/2001 | Diebeck ................ 29/890.043 |
| 6,273,180 B1 | * | 8/2001 | Joshi et al. .................. 165/158 |
| 6,347,662 B1 | * | 2/2002 | Davidian et al. ........... 165/166 |

FOREIGN PATENT DOCUMENTS

| | | |
|---|---|---|
| DE | 93 19 559.1 | 2/1994 |
| EP | 0 267 349 A1 | 5/1988 |
| EP | 1 008 828 A1 | 6/2000 |
| GB | 2 073 395 A | 10/1981 |
| JP | 404263720 A * | 9/1992 |

OTHER PUBLICATIONS

Dynamit Nobel, "Dynaplat Compounds by Explosive", May 22–27, 2000, pp. 1–5 along with English Translation.

* cited by examiner

Primary Examiner—Henry Bennett
Assistant Examiner—Tho V. Duong
(74) Attorney, Agent, or Firm—Millen, White, Zelano & Branigan, P.C.

(57) ABSTRACT

The invention relates to a plate heat exchanger that consists of several pieces of sheet metal that are arranged parallel to one another, that are at least partially corrugated and that form a considerable number of heat-exchange passages. A header creates a flow connection among at least some of the heat-exchange passages. At least two parts (1, 2, 3) of the plate heat exchanger consist of metallic materials that cannot be welded to one another.

4 Claims, 1 Drawing Sheet

PLATE HEAT EXCHANGER

This invention relates to a plate heat exchanger comprising a plurality of layers of at least partially corrugated sheet metal arranged parallel to one another, forming a plurality of heat-exchange passages, and at least one header that creates a flow connection among at least some of the heat-exchange passages.

Plate heat exchangers are built from several corrugated sheets (hereinafter referred to as "fins") that are stacked over one another and that ate separated from one another in each case by flat metal partitions. The fins and partitions are connected tightly to one another in such a way that a heat-exchanger block is produced, thereby forming a plurality of heat-exchange passages for streams to be brought into heat exchange with one another. To introduce and withdraw the streams, headers with supports used for attaching the incoming or outgoing pipelines are mounted via the inlet or outlet openings of the heat-exchange passages.

All components of the plate heat exchangers are made from the same material, often from aluminum of aluminum alloys. Aluminum plate-fin heat exchangers are described in a brochure of Linde AG. Processing Engineering and Contracting Division entitled "Aluminum plate-fin heat exchangers". Description of other plate heat exchangers are found in the literature, e.g. Chemical Engineers' Handbook, Perry & Chilton, 5th edition, McGraw-Hill, New York, 1973 pages 11–22 and 11–23.

The headers of the plate heat exchangers are often made of aluminum alloys having an increased strength compared to aluminum, but a relatively low strenth compared to steel. At high pressures, therefore, only headers and supports with relatively small diameters can be used. To be able to heat or to cool large throughputs of mass under high pressure in aluminum heat exchangers, frequently several individual plate heat-exchanger blocks must be arranged on parallel. Even in the individual blocks under these conditions, double headers with several supports are, however, unavoidable. The design of aluminum plate heat exchangers is therefore very expensive in the case of certain flow criteria, especially under high pressures and at high flow rates.

SUMMARY OF THE INVENTION

An object of this invention is to provide an improved plate heat exchanger. Another object is to provide a novel header construction. Upon further study of the specification and appended claims, other objects of the invention will become apparent.

The objects are achieved according to the invention by a plate heat exchanger of the above-mentioned type, in which at least two parts of the plate heat exchanger comprise metallic materials that cannot be welded to one another on an industrial scale.

Consequently, the plate heat exchanger according to the invention are not limited to only one material, but rather require at least two different metallic materials. The two different materials can be adapted to the specific operational requirements of the individual components of the plate heat exchanger. Thus, for components that are exposed to an elevated compression stress, for example for the header of the heat exchanger, a metal is used that has a higher strength than the material used for the heat exchanger block.

The two parts of the heat exchanger that comprises different metals or different metal alloys are preferably bonded integrally together. Even at high stresses within the plate heat exchanger, the bond should provide a stable, durable and tight connection. By using fasteners which provide clamping or frictional connections, for example by screwing two components together, it is very difficult, owing to the different thermal coefficients of expansion, to connect the components tightly enough together so that the sealing of the flow paths in the plate heat exchanger is ensured permanently.

As mentioned above, it is often very difficult to provide a connection of different metallic materials that can withstand the thermal stresses of a heat exchanger. Fasteners which provide a clamping or frictional connection often are not satisfactory because of thermal expansion, and a more stable material is not possible partially because of the different properties of the metals that are involved. Thus, for example, aluminum and steel cannot be welded to one another at least on an industrial scale, and in the context of this invention such metals are considered non-weldable to each other.

It has therefore proven advantageous to provide an intermediate piece between the two components which piece comprises at least two different metals or metal alloys similar to the various metallic materials in the components that are to be connected to one another. The metals of the intermediate piece are selected in such a way that at least two surfaces of the intermediate piece are present, which in each case can be connected to one of the two components in a tight and heat-resistant manner. Each component is preferably welded to one of the two sides of the intermediate piece which has the same type of metal.

The intermediate piece can be produced in various conventional ways while maintaining satisfactory bonding strengths. Individual metal layers of the intermediate piece can be applied, for example, by thermal coating. Preferably, the intermediate piece is produced by explosive plating of two or more metals. To this end, two or more metal plates are placed on one another and are provided with a layer of explosive substance. The pressures that are produced in an explosion bring the metals in the area of the boundary layer between two metal plates into the plastic state, by which a durable and tight connection is created.

The invention is suitable especially for plate heat exchangers in which the sheets or the entire heat exchanger blocks consist essentially of aluminum. To date, headers made of aluminum are also attached to such heat exchanger blocks, which are accompanied, however, by the above-mentioned strength problems. Headers made of steel, especially Cr—Ni steel, low-temperature steel or C-steel, are preferably used. The higher strength values of the steel headers allow larger header and support dimensions. The previously required double header with multiple supports or even the parallel arrangement of several plate heat exchangers is avoided or at least reduced. As a result, it is no longer necessary to have costly and difficult intermediate tubing between individual heat exchanger blocks.

Steel headers also provide additional cost advantages in the case of the tubing. For pipelines between different plate heat exchangers, which can now be made of steel instead of aluminum, smaller wall thicknesses in comparison to aluminum can now be provided owing to the higher strength of steel. The costs and the difficulty of the welding are significantly reduced. The steel pipelines from the plate heat exchangers that lead from or to the latter can be welded directly to the supports of the header and no longer must be connected to the latter via flange connections.

The headers are fastened to the heat exchanger block via an intermediate piece that comprises a composite material that preferably contains at least aluminum and steel.

The intermediate piece is excised from a plate of the composite material, which corresponds in size to approximately the contact surface between the header and the heat exchanger block. One opposing side of the intermediate piece consists essentially of aluminum and the other opposing side consists essentially of steel. The intermediate piece is welded to the header on its steel side and then the thus prepared novel header construction is welded on the aluminum side to the heat exchanger block.

The intermediate piece provides for a slightly elevated position of the header, thereby making the weld more readily accessible and facilitating the welding. Moreover, the distance between two adjacent headers can be reduced, which results in a reduction in size of the heat exchanger block.

The heat exchanger according to the invention can be used in the temperature range of for example, between −270° C. and +200° C. and at an operating pressure of for example, from vacuum conditions to over 100 bar. In the entire range of use, the gas sealing property and stability of the heat exchanger are ensured.

BRIEF DESCRIPTION OF THE DRAWINGS

The invention as well as other details of the invention are explained in more detail below based on the embodiments that are depicted in the drawings, wherein.

Figure 1:
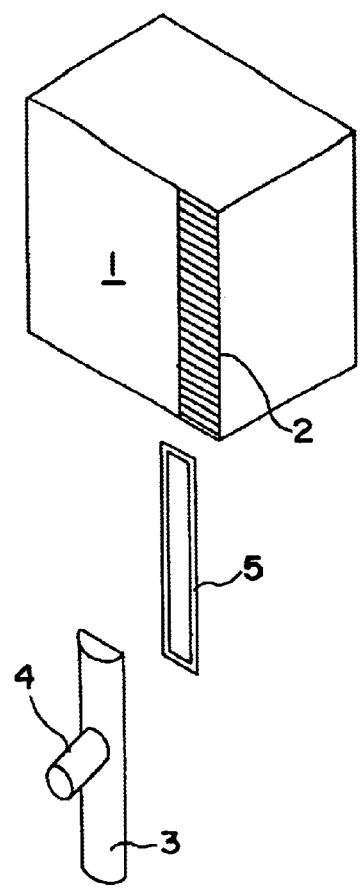
FIG. 1 diagrammatically depicts the structure of a plate heat exchanger according to the invention.
Figure 1A:
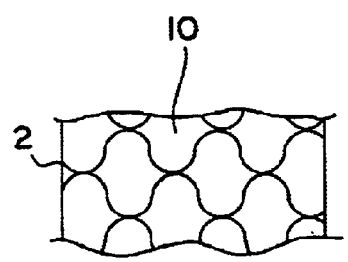
FIG. 1A is an enlarged portion of the heat exchanger of FIG. 1 showing corrugated heat exchanger plates.

A heat exchanger block comprises a housing 1 containing corrugated and flat aluminum sheets conventionally soldered together in a soldering furnace. The heat-exchange passages formed between the sheets are closed to the outside by cover strips forming the housing. An area 2 is used as an intake opening to the heat-exchange passages. A header 3, which is provided with a connecting piece 4, creates a flow connection between the supply line for one of the fluids that is to undergo heat exchange, not shown, through the connecting piece 4, to the heat-exchange passages. As is seen in FIG. 1A the heat exchanger may have corrugated heat exchanger plates 10.

Figure 2:
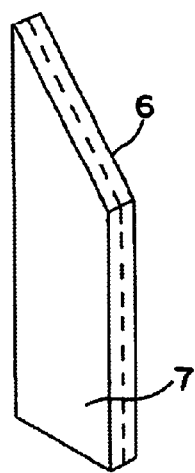
FIG. 2 depicts the composite material in detail.

A frame 5 is welded to header 3, and the thus prepared header is then welded gastight to intake opening 2. In order to be gastight, the intake opening 2 of the housing 1 has a selected area, and the header 2 has a corresponding outlet area with the frame 5 forming an intermediate piece disposed therebetween also enclosing the corresponding area. Frame 5 is depicted more precisely in FIG. 2. Frame 5 consists essentially of an aluminum layer 6 and a steel sheet 7, which are connected to one another using an explosive plating process. The thus produced plate heat exchange is distinguished by high strength and is preferably used in high-pressure applications. For further details of the explosive plating process, reference is made to the literature, for example, the attached brochure by Dynamit Nobel entitled ADynaplat Verbindungen durch Sprengstoff.

In the specification and the following claims,

Cr—Ni steel is any steel alloyed with chromium and nickel;

low temperature steel is any steel alloyed for low temperature application; and

C-steel is any unalloyed steel.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 10022595.0, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A plate heat exchanger block comprising: an aluminum or aluminum alloy housing, at least partly within said housing a plurality of aluminum or aluminum alloy sheets (2) of at least partially corrugated metal arranged parallel to one another and forming a plurality of heat-exchange passages, at least one steel header (3) in communication with at least some of the heat-exchange passages, wherein at least two parts (1, 2, 3) of the plate heat exchanger block consist essentially of aluminum metallic materials that cannot be welded to one another, and wherein the plate heat exchanger block includes an intermediate piece (5) between the header (3) and the heat exchange passages (2) containing the plurality of sheets, the intermediate member having a steel part facing the header and an aluminum part facing the housing, the parts being explosively bonded together wherein the intermediate piece is welded, aluminum-to-aluminum or aluminum alloy, to at least one of (a) the housing and (b) the corrugated sheets and is also welded steel-to-steel with the steel header.

2. A plate heat exchanger according to claim 1, wherein sheets (2) consist essentially of aluminum.

3. A plate heat exchanger according to claim 1, wherein header (3) consists essentially of steel.

4. The plate heat exchanger block of claim 1 wherein the housing has an inlet opening of a selected area and wherein the header has a corresponding outlet area, the intermediate piece disposed therebetween also enclosing a corresponding area.

* * * * *

UNITED STATES PATENT AND TRADEMARK OFFICE
CERTIFICATE OF CORRECTION

PATENT NO. : 6,886,629 B2
DATED : May 3, 2005
INVENTOR(S) : Dietrich

It is certified that error appears in the above-identified patent and that said Letters Patent is hereby corrected as shown below:

Title page,
Item [73], Assignee, change "Akiengesellschaft" to -- Aktiengesellschaft --.

Signed and Sealed this

Thirtieth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,886,629 B2
DATED : May 3, 2005
INVENTOR(S) : Dietrich

It is certified that error appears in the above-identified patent and that said Letters Patent is hereby corrected as shown below:

Title page,
Item [73], Assignee, change "Weisbaden" to -- Wiesbaden --.

Signed and Sealed this

Eighth Day of November, 2005

JON W. DUDAS
*Director of the United States Patent and Trademark Office*